United States Patent
Greenberg et al.

(10) Patent No.: US 10,272,539 B2
(45) Date of Patent: Apr. 30, 2019

(54) APPARATUS AND METHOD FOR MACHINING AN INTERFACE BETWEEN FIRST AND SECOND LAYERS OF A WORKPIECE

(71) Applicant: The Boeing Company, Chicago, IL (US)

(72) Inventors: Craig Greenberg, Everett, WA (US); Matthew John Buffaloe, Seattle, WA (US); Robin Despins, Everett, WA (US)

(73) Assignee: The Boeing Company, Chicago, IL (US)

( * ) Notice: Subject to any disclaimer, the term of this patent is extended or adjusted under 35 U.S.C. 154(b) by 648 days.

(21) Appl. No.: 14/830,959

(22) Filed: Aug. 20, 2015

(65) Prior Publication Data

US 2017/0050290 A1 Feb. 23, 2017

(51) Int. Cl.
*B24B 39/02* (2006.01)
*B29C 65/00* (2006.01)

(52) U.S. Cl.
CPC .............. *B24B 39/02* (2013.01); *B29C 66/84* (2013.01)

(58) Field of Classification Search
CPC ...... B23P 1/00; B23P 3/00; B23P 5/00; B23Q 1/00; B23Q 11/00; B23Q 7/00
See application file for complete search history.

(56) References Cited

U.S. PATENT DOCUMENTS 4,448,098 A * 5/1984 Totsu ..................... B25B 15/04
81/467

4,781,085 A * 11/1988 Fox, III .............. B25B 23/0021
81/177.1

(Continued)

FOREIGN PATENT DOCUMENTS

CN 201132188 Y 10/2008
CN 102470419 A 5/2012

(Continued)

OTHER PUBLICATIONS

Muratec Murata Machinery, Ltd., "Motorum M3048TG / M3058TG CNC Servo Motor Driven Ram Turret Punch Press," pp. 1-5, http://www.muratec.net/sm/products/tp/m3048tg.html.

(Continued)

*Primary Examiner* — Lee D Wilson
(74) *Attorney, Agent, or Firm* — Womble Bond Dickinson (US) LLP

(57) ABSTRACT

A tool is provided for machining an interface between coplanar first and second layers of a workpiece that defines an orifice extending at least partially through the first and second layers and intersecting the interface. A housing portion includes a first end, a longitudinally-opposed second end, and a peripheral surface extending therebetween. The housing portion is configured to rotate about its longitudinal axis and extend at least partially through the orifice. A contacting element operably engaged with the housing portion between the first and second ends and proximate the peripheral surface is movable between stored and operating positions. The contacting element is configured to extend outwardly from the peripheral surface of the housing portion to operably engage the interface within the orifice when the contacting element is in the operating position. An associated method is also provided.

24 Claims, 14 Drawing Sheets

(56) References Cited

U.S. PATENT DOCUMENTS

| | | | | |
|---|---|---|---|---|
| 5,595,095 | A * | 1/1997 | Hillinger | B25B 13/461 |
| | | | | 81/58.3 |
| 5,711,193 | A * | 1/1998 | Eggert | B25B 13/463 |
| | | | | 81/58.1 |
| 7,942,253 | B2 * | 5/2011 | Schneeman | B25B 15/04 |
| | | | | 192/43.2 |
| 2004/0069096 | A1 * | 4/2004 | Cha | B25B 13/06 |
| | | | | 81/57.13 |
| 2008/0163726 | A1 * | 7/2008 | Wente | B25B 23/0021 |
| | | | | 81/177.2 |
| 2009/0078093 | A1 * | 3/2009 | Suski, Jr. | B25B 13/56 |
| | | | | 81/121.1 |
| 2010/0107828 | A1 * | 5/2010 | Huerta | B25B 13/461 |
| | | | | 81/177.9 |
| 2016/0167205 | A1 * | 6/2016 | Wang | B25B 17/00 |
| | | | | 81/58.3 |
| 2017/0050290 | A1 * | 2/2017 | Greenberg | B24B 39/02 |

FOREIGN PATENT DOCUMENTS

| | | |
|---|---|---|
| CN | 103025454 A | 4/2013 |
| CN | 104797355 A | 7/2015 |
| RU | 2279961 C1 | 7/2006 |

OTHER PUBLICATIONS

Chinese Office Action dated Jan. 14, 2019 for Chinese Patent Application No. 201610411924.

* cited by examiner

APPARATUS AND METHOD FOR MACHINING AN INTERFACE BETWEEN FIRST AND SECOND LAYERS OF A WORKPIECE

TECHNOLOGICAL FIELD

The present disclosure generally relates to machining a workpiece comprising first and second layers after a first machining or manufacturing process has been performed on the workpiece.

BACKGROUND

During a machining or manufacturing process, a joined structure may be assembled by joining coplanar first and second layers to form an interface between the first and second layers. Additionally, such a process may include assembling the joined structure with another element. For example, portions of a machine, such as an aircraft, having such a joined structure may be assembled with other portions of the machine. As such, in order to assemble the joined structure with the other portion, an orifice may be formed in the joined structure. The orifice may extend through the interface between the first layer and the second layer and through the first and second layers as well. Forming the orifice in the joined structure may produce burrs, structural anomalies and/or the like proximate the interface between the first layer and the second layer. Such anomalies are known to reduce fatigue characteristics of a workpiece.

To improve the fatigue performance of the interface between the first layer and the second layer, the joined structure may be subjected to a deburring process. Some deburring processes may include disassembling the joined structure such that the first layer and the second layer are removed from one another and then removing/cutting away the burrs about the orifice/hole through each of the respective layers. Other such deburring processes may utilize a cutting edge to trim and/or remove burrs at the interface between the first layer and the second layer within the orifice, without disassembly thereof. For example, one deburring process may include cutting away a portion of the joined structure proximate the interface between the first layer and second layer disposed within the orifice with a cutting tool, thereby removing the burred structure. However, such deburring processes may adversely impact the fatigue resistance of the joined structure proximate the interface due to removal of material if the cutting tool is not precisely positioned with respect to the interface. Accordingly, a need exists to improve the fatigue performance of an interface between a first layer and a second layer within an orifice/hole defined by a joined structure without adversely affecting the fatigue resistance of the structure proximate the interface.

BRIEF SUMMARY

Example implementations of the present disclosure are directed to an apparatus configured to machine an interface between a first layer and a second layer of a workpiece that defines an orifice. Example implementations provide a tool configured to machine an interface between coplanar first and second layers of a workpiece that defines an orifice extending at least partially through the first and second layers and intersecting the interface. For example, implementations provide a tool configured to coin (i.e., provide sufficiently high stresses to a material to induce plastic flow) an interface between coplanar first and second layers of the workpiece. Such a tool includes a housing portion having a first end, a longitudinally-opposed second end, and a peripheral surface extending between the first end and the second end. The housing portion is configured to rotate about a longitudinal axis of the housing portion and extend at least partially through the orifice. At least one contacting element is operably engaged with the housing portion between the first and second ends and proximate the peripheral surface. The at least one contacting element is configured to be movable between a stored position and an operating position. The at least one contacting element is configured to extend outwardly from the peripheral surface of the housing portion to operably engage the interface between the first layer and the second layer within the orifice when the at least one contacting element is in the operating position.

Example implementations may also provide a method of machining an interface between coplanar first and second layers of a workpiece using a tool that includes a housing portion and at least one contacting element. The housing portion may have a first end, a longitudinally-opposed second end, and a peripheral surface extending between the first end and the second end. The contacting element may be operably engaged with the housing portion between the first and second ends and proximate the peripheral surface, and may be configured to move between a stored position and an operating position. The method includes positioning a tool within an orifice extending at least partially through the first and the second layers of the workpiece. A sidewall of the orifice intersects the interface. Additionally, the method includes engaging and compressing the sidewall at the interface using the at least one contacting element in the operating position.

The features, functions and advantages discussed herein may be achieved independently in various example implementations or may be combined in yet other example implementations, further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1A:
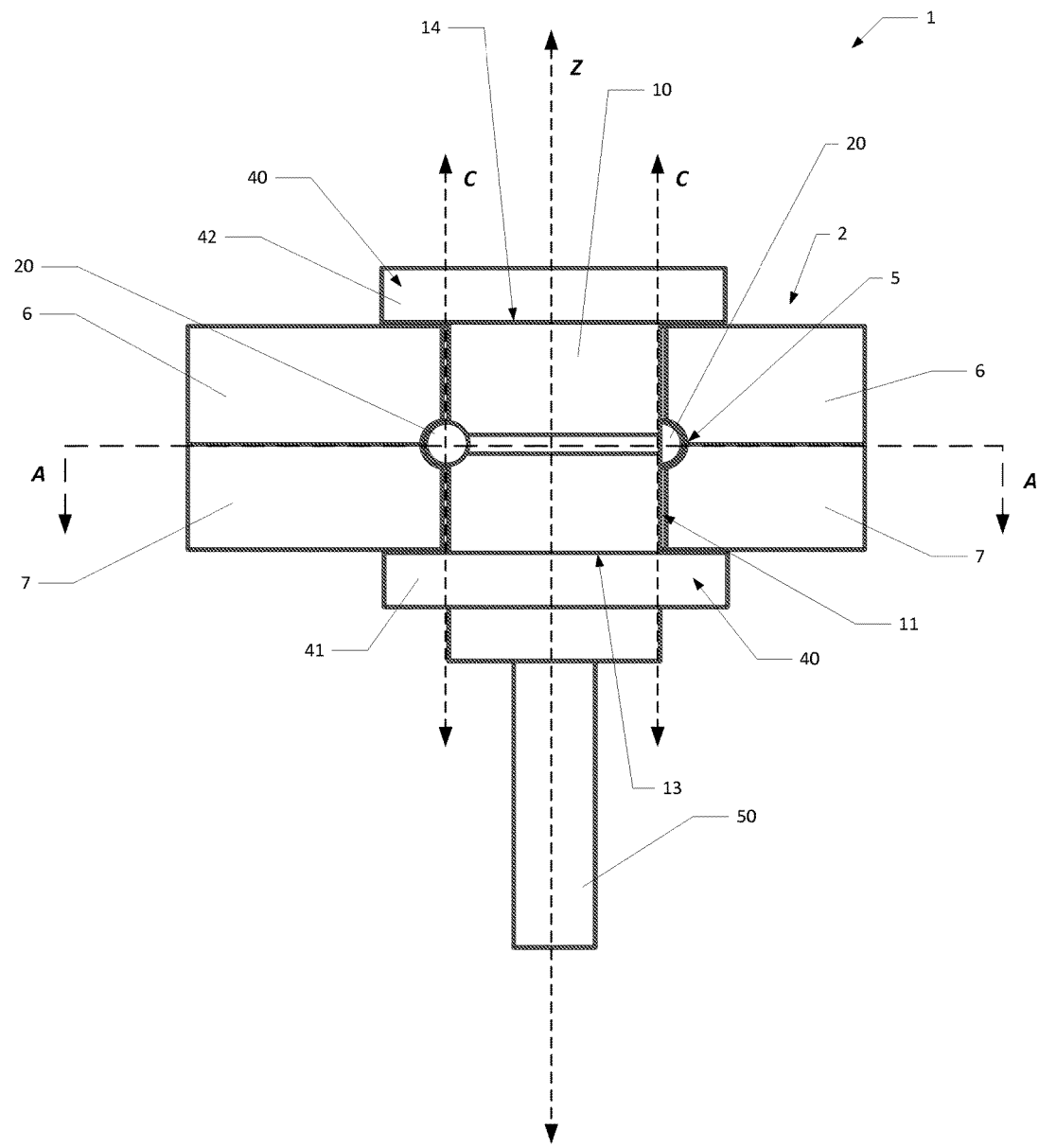
FIG. 1A is a cross-sectional view of a tool configured to machine an interface between a first material and a second material within an orifice defined by a structure according to example implementations of the present disclosure.

Some implementations of the present disclosure will now be described more fully hereinafter with reference to the accompanying drawings, in which some, but not all implementations of the disclosure are shown. Indeed, various implementations of the disclosure may be expressed in many different forms and should not be construed as limited to the implementations set forth herein; rather, these exemplary implementations are provided so that this disclosure will be thorough and complete, and will convey the scope of the disclosure to those skilled in the art. For example, unless otherwise indicated, something being described as being a first, second or the like should not be construed to imply a particular order. Also, something may be described as being above something else (unless otherwise indicated) may instead be below, and vice versa; and similarly, something described as being to the left of something else may instead be to the right, and vice versa. As used in the specification, and in the appended claims, the singular forms "a", "an", "the", include plural referents unless the context clearly dictates otherwise. Reference numerals refer to like elements throughout.

The present disclosure generally relates to improving the fatigue performance of a workpiece comprising a first layer and a second layer after a machining or manufacturing process has been performed on the workpiece. In particular, this disclosure generally relates to improving the fatigue performance of an interface between coplanar first and second layers of a workpiece following the machining or manufacturing process. For example, fatigue performance is improved within an orifice defined by and extending through the first and second materials substantially perpendicularly to the interface. Example implementations of the present disclosure are directed to an apparatus configured to improve fatigue performance of an interface between a first material and a second material within an orifice defined by a workpiece. Example implementations provide a simplified and efficient approach to mitigate reduced fatigue capabilities within an orifice in joined structures due to burrs, imperfections, deformations and/or flaws due to a machining or manufacturing process performed on the workpiece.

Figure 2A:
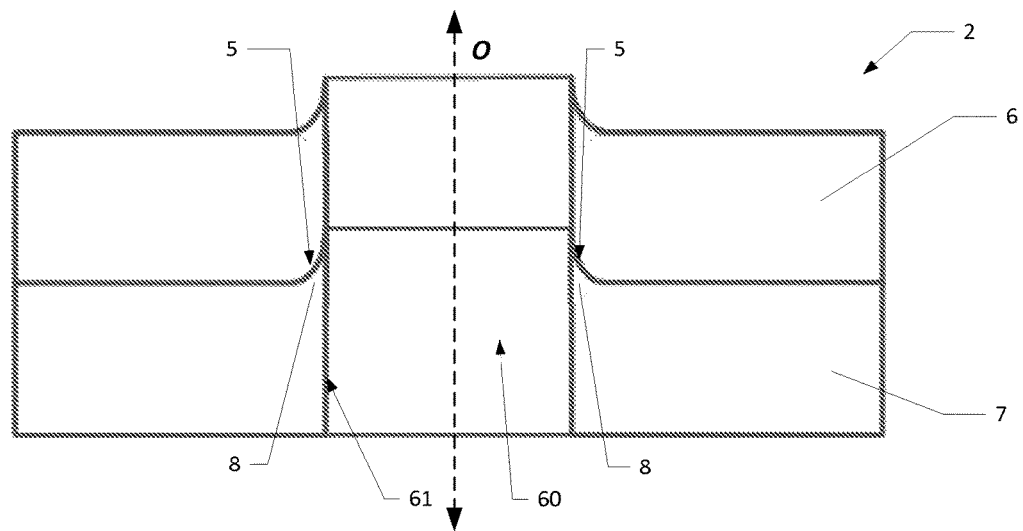
FIG. 2A is a cross-sectional view of a workpiece including a first material and a second material after a machining or manufacturing process has formed an orifice through the workpiece according to example implementations of the present disclosure.
Figure 2B:
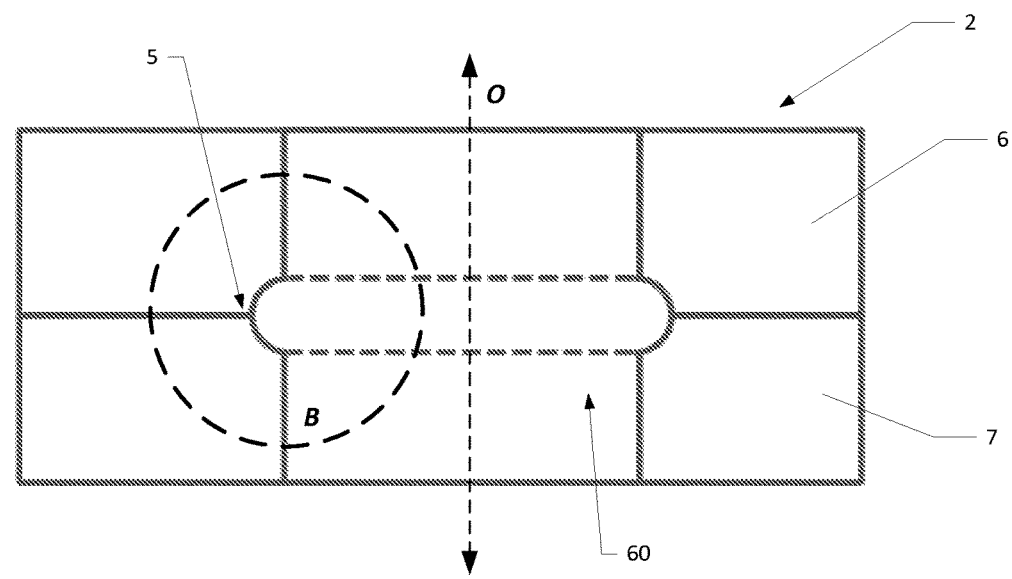
FIG. 2B is a cross-sectional view of a workpiece after a tool according to example implementations of the present disclosure has engaged the workpiece.
Figure 2C:
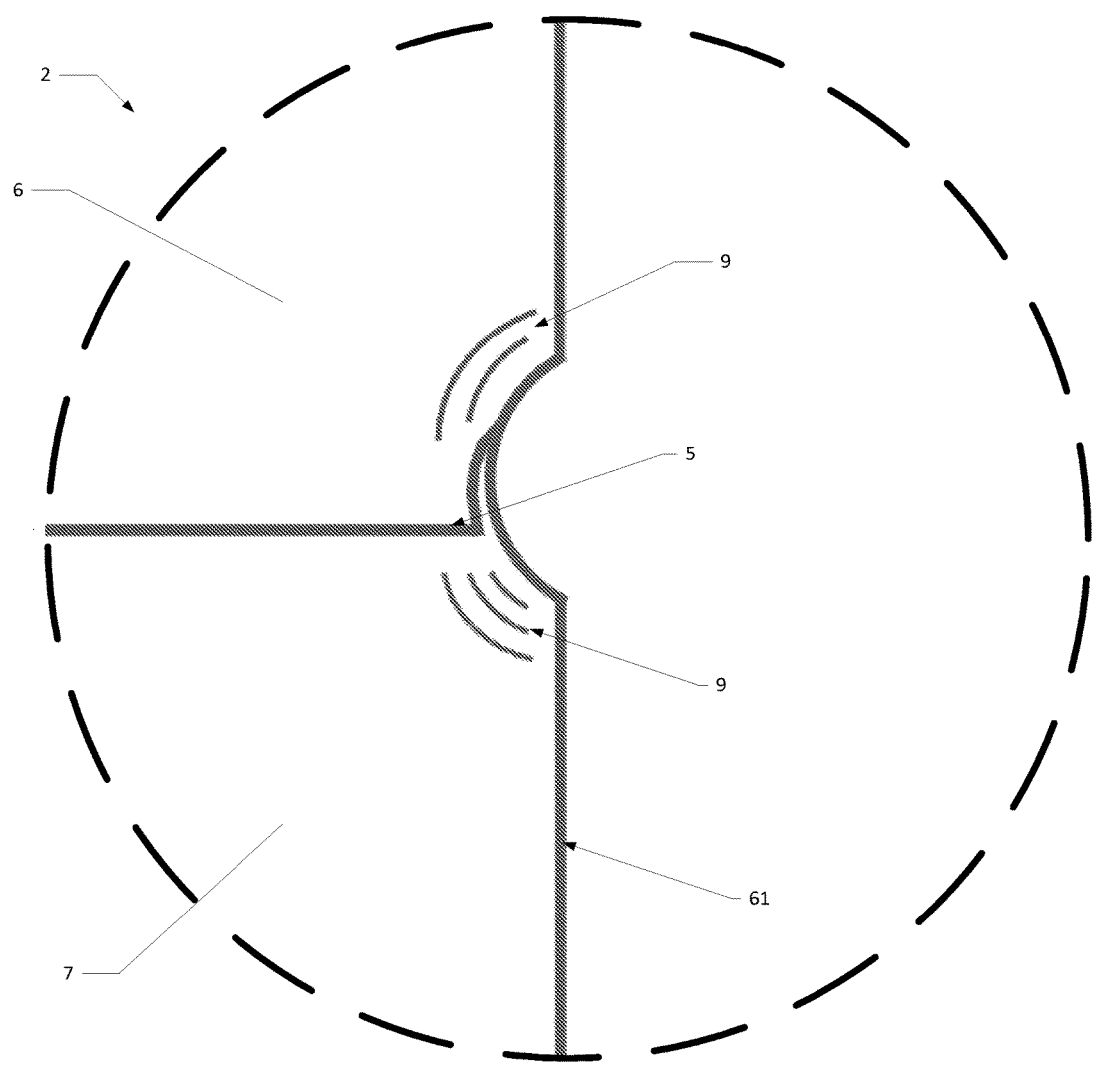
FIG. 2C is an enlarged view of the circle B in FIG. 2B that illustrates plastic deformation zones about an interface between a first material and a second material in a workpiece, according to example implementations of the present disclosure.

Implementations of the present disclosure provide a tool configured to machine an interface between coplanar first and second materials of a workpiece. In particular, the tool may be configured to machine the interface when the tool is disposed within an orifice that is defined by and extends through the first and second materials. In some implementations, the orifice may extend substantially perpendicular to the interface. FIG. 1A illustrates a tool 1 configured to machine an interface 5 between a first layer 6 and a second layer 7 disposed within an orifice 60 defined at least partially through a workpiece 2. As shown in FIGS. 2A and 2C, a sidewall 61 of the orifice 60 extends through the first layer 6 and the second layer 7 and intersects the interface 5. The orifice has a longitudinal axis O that intersects the interface 5. In a particular implementation, the longitudinal axis O is substantially perpendicular to the interface 5; however, the longitudinal axis O may be any suitable angle with respect to the interface 5.

According to one implementation, the material of the first layer 6 and the material of the second layer 7 of the workpiece 2 may be the same material. In some implementations, the first layer 6 and the second layer 7 may each include, for example, aluminum, titanium, steel, and/or other metallic materials and/or alloys. Accordingly, various implementations of the present disclosure may advantageously provide a tool configured to improve the fatigue performance of an interface between a first layer 6 and a second layer 7 that both comprise the same metallic material. According to another implementation, the first layer 6 and/or the second layer 7 may include a carbon-fiber reinforced polymer. In some implementations, the first layer 6 may differ from the second layer 7, and accordingly, the first layer 6 may have physical properties differing from the corresponding physical properties of the second layer 7. For example, the first layer 6 may be a fiber composite material, and the second layer 7 may be a metallic material.

As shown in FIG. 1A, the tool 1 includes a housing portion 10 that is configured to rotate about the longitudinal axis Z of the housing portion 10. In the exemplary implementation, the tool 1 is configured to rotate about the longitudinal axis Z in a clockwise and/or counter-clockwise direction. The housing portion 10 includes a peripheral surface 11 that extends between a first end 13 and a longitudinally-opposed second end 14 of the housing portion 10. The housing portion 10 is adapted to extend through the orifice 60 defined within or through the workpiece 2.

Additionally, the tool 1 includes at least one contacting element 20 disposed proximate the peripheral surface 11 of the housing portion 10. The at least one contacting element 20 is operably engaged with the housing portion 10 proximate the peripheral surface 11. The at least one contacting element 20 is configured to move between a stored position at or under the peripheral surface 11 and an operating position outwardly of the peripheral surface 11. As shown in FIG. 1A, when the contacting elements 20 are disposed in the operating position outwardly of the peripheral surface 11, the contacting elements 20 are further configured to operably engage and plastically deform a portion of the workpiece 2 proximate the interface 5 between the first layer 6 and the second layer 7. In this regard, FIG. 2A illustrates a workpiece 2 that includes a plurality of burrs 8 formed from a machining or manufacturing process that produced the orifice 60, and FIG. 2B illustrates the workpiece 2 after an interface edge coining process conducted by the tool 1 has been completed. In particular, FIG. 2C illustrates an enlarged view of the circle B in FIG. 2B, and more particularly, illustrates the plastic deformation zones 9 formed on the workpiece 2 after the at least one contacting element 20 operably engages the interface 5 within the orifice 60. Additionally, FIG. 2C illustrates a portion of the interface 5 that previously included at least one burr 8 (shown in FIG. 2A) after the portion of the interface 5 has been plastically deformed by the contacting elements 20. In particular, FIG. 2C illustrates a portion of the interface 5 after the at least one contacting element 20 has operably engaged and manipulated any burrs 8 about the interface 5 within the orifice 60. In particular, the portion of the interface 5 that previously included any burrs 8 may be manipulated by, for example, changing the shape of the burrs 8, removing the burrs 8, reducing the number of burrs 8, and/or the like.

Returning to FIG. 1A, the tool 1 may further include a power unit 50 operably engaged with the housing portion 10. In some implementations, the power unit 50 may be configured to rotate the housing portion 10 about the longitudinal axis Z of the housing portion 10. For example, the power unit 50 may include a motor such as, for example, a hydraulic motor, an electric motor, a mechanical motor, and/or the like configured to rotate the housing portion 10. In some example implementations, the power unit 50 may further include a controller operably engaged with the motor. The controller is adapted to control the power unit 50 for performing one or more functions or operations with respect to the workpiece 2 during a machining process such as, for example, an interface edge coining process disclosed herein.

Additionally, the tool 1 may include a clamping mechanism 40 configured to position the housing portion 10 of the tool 1 at least partially through the orifice 60 when the clamping mechanism 40 is coupled to the housing portion 10 and the workpiece 2. In this regard, the clamping mechanism 40 may position the housing portion 10 such that the at least one contacting element 20 is disposed within the orifice 60 proximately to and coplanar with the interface 5 and is operably engaged with the interface 5 when the at least one contacting element 20 is disposed in the operating position.

Although the clamping mechanism 40 is configured to accurately position the housing portion 10 such that the at least one contacting element 20 is disposed within the orifice 60 proximately to and coplanar with the interface 5, various implementations described herein advantageously provide for greater tolerances when positioning the housing portion 10 and the at least one contacting element 20. In this regard, known deburring processes require accurately positioning a cutting tool to remove the burr 8. For example, if the cutting tool of a known deburring process is inaccurately positioned along the longitudinal axis O of the orifice 60, then a portion of the first or second layers 6, 7 could be undesirably removed from the workpiece 2. Implementations of the present disclosure, however, provide at least one contacting element 20 that is configured to operably engage the interface 5 such that the interface 5 and regions proximate the interface 5 are subjected to the benefits provided by the at least one contacting element 20 imparting a coining force to the interface 5.

The clamping mechanism 40 may further include a first clamp 41 configured to couple to the first end 13 of the housing portion 10 and a second clamp 42 configured to couple to the longitudinally-opposed second end 14 of the housing portion 10. In some implementations, the first and second clamps 41, 42 may be configured to engage the workpiece 2 such that the housing portion 10 and the at least one contacting element 20 of the tool 1 remain substantially stationary along the longitudinal axis Z as the power unit 50 rotates the housing portion 10.

Figure 1B:
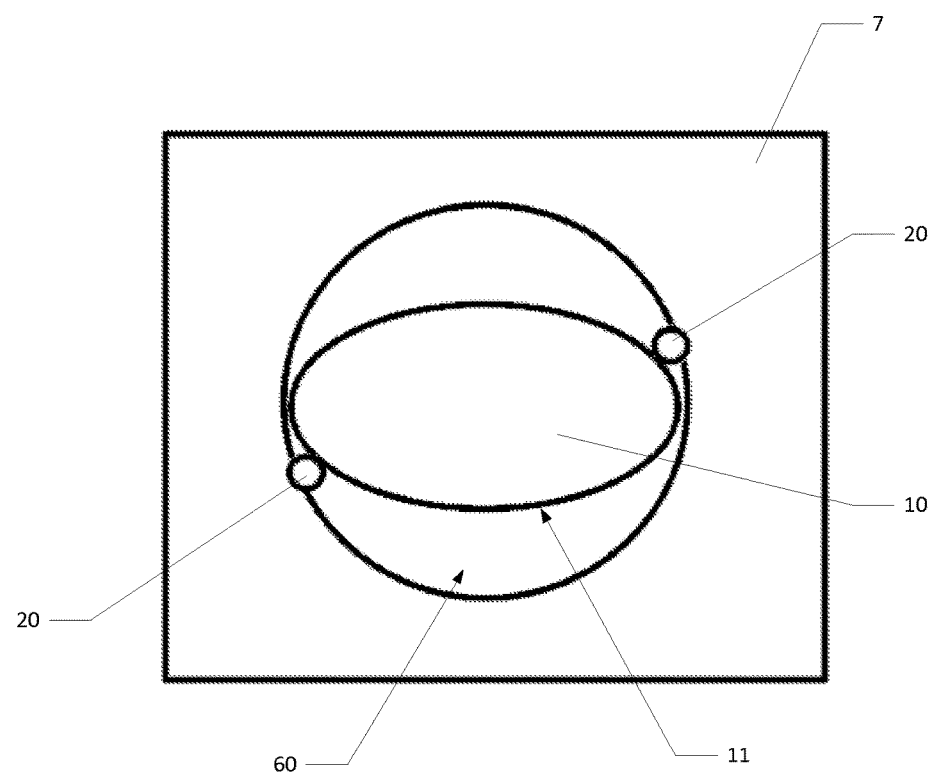
FIG. 1B is a cross-sectional view of the tool illustrated in FIG. 1A taken along line A-A that illustrates contacting elements of a tool disposed in an operating position according to example implementations of the present disclosure.

As previously mentioned, the housing portion 10 is configured to rotate about a longitudinal axis Z of the housing portion 10. FIG. 1B is a cross-sectional view of the tool illustrated in FIG. 1A taken along line A-A in FIG. 1A. In particular, FIG. 1B illustrates the contacting elements 20 being disposed in the operating position. That is, the contacting elements 20 are also each configured to engage the interface 5 within the orifice 60. Additionally, FIG. 1B illustrates that the housing portion 10 may have a cross-sectional shape of a cam such as, for example, an elliptically-shaped cam. Although illustrated in FIG. 1B as having a cross-sectional shape of an elliptically-shaped cam, the housing portion 10 may have any suitable cross-sectional shape (e.g., elliptical, round, egg or pear shaped, snail or drop shaped, irregularly shaped with one or more arcuate surfaces) that provides for the contacting elements 20 to extend outwardly from the peripheral surface 11 of the housing portion 10 to operably engage and plastically deform the interface 5 when the contacting elements 20 are disposed in the operating position.

In particular, the housing portion 10 may have a cross-sectional shape suitable for either high-speed and/or low-speed rotation. Additionally, the housing portion 10 may be shaped such that rotation of the housing portion 10 causes the contacting elements 20 to provide a coining force to the interface 5 within the orifice 60. The coining force is a compressive force that induces sufficiently high stresses in the material to induce plastic flow on the material surface (e.g., on a sidewall 61 of the orifice 60). Inducing a coining force may reduce grain size and/or work harden the material surface. In some implementations, the housing portion 10 may be shaped such that the coining force imparted by the contacting elements 20 to the workpiece 2 about the interface 5 varies with the rotational position and/or rotational velocity of the housing portion 10 and/or the contacting elements 20.

Figure 3A:
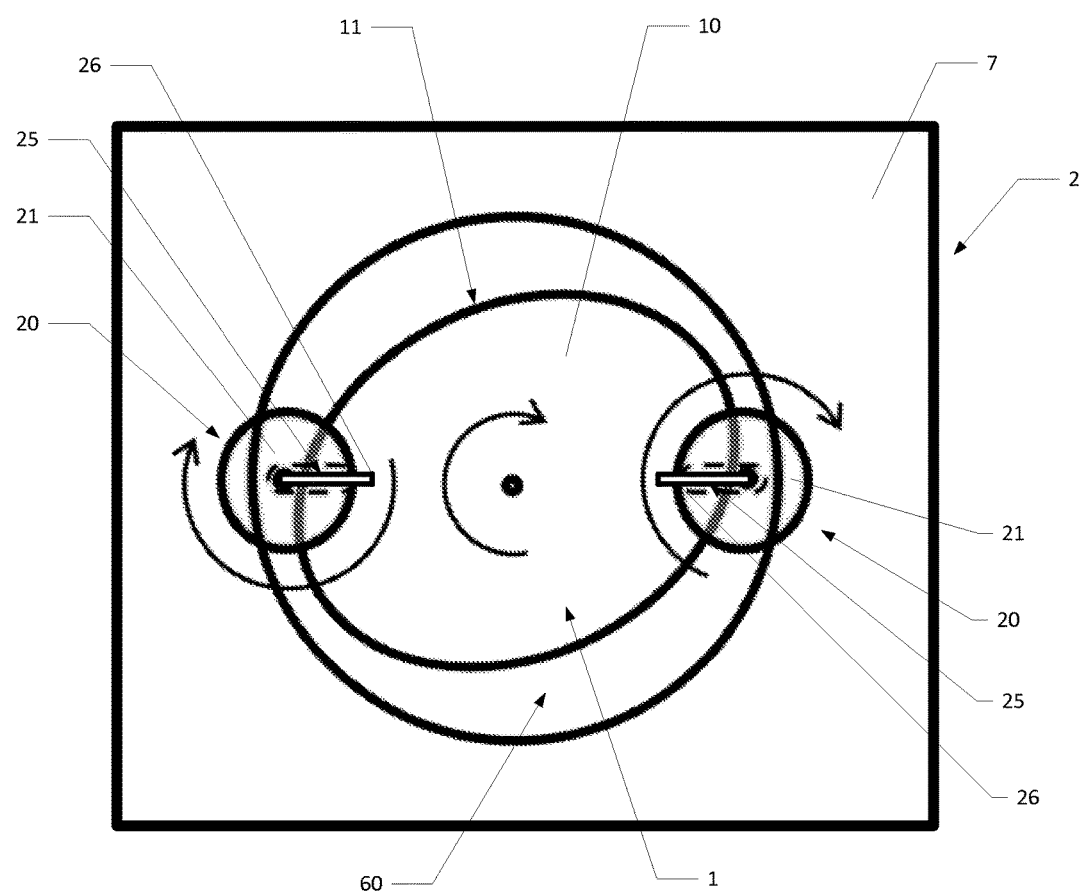
FIG. 3A is a cross-sectional view of a workpiece and contacting elements of a tool according to example implementations of the present disclosure disposed in an operating position.
Figure 3B:
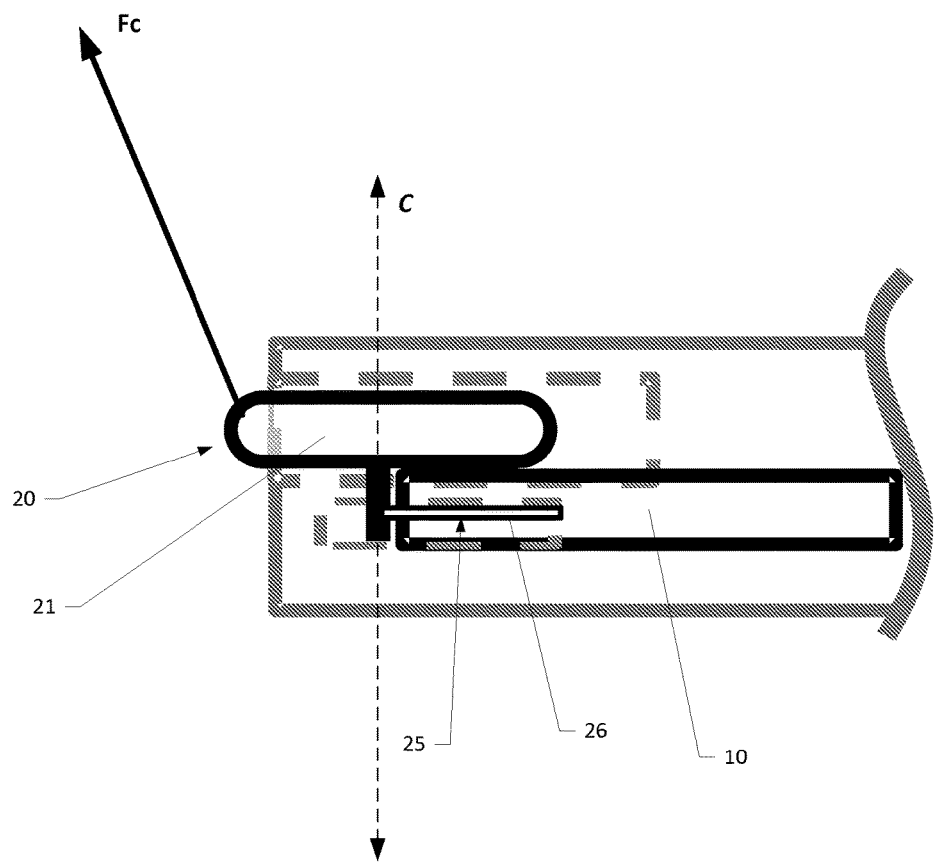
FIG. 3B is a partial, cross-sectional view of a housing portion and a contacting element of a tool according to example implementations of the present disclosure.
Figure 3C:
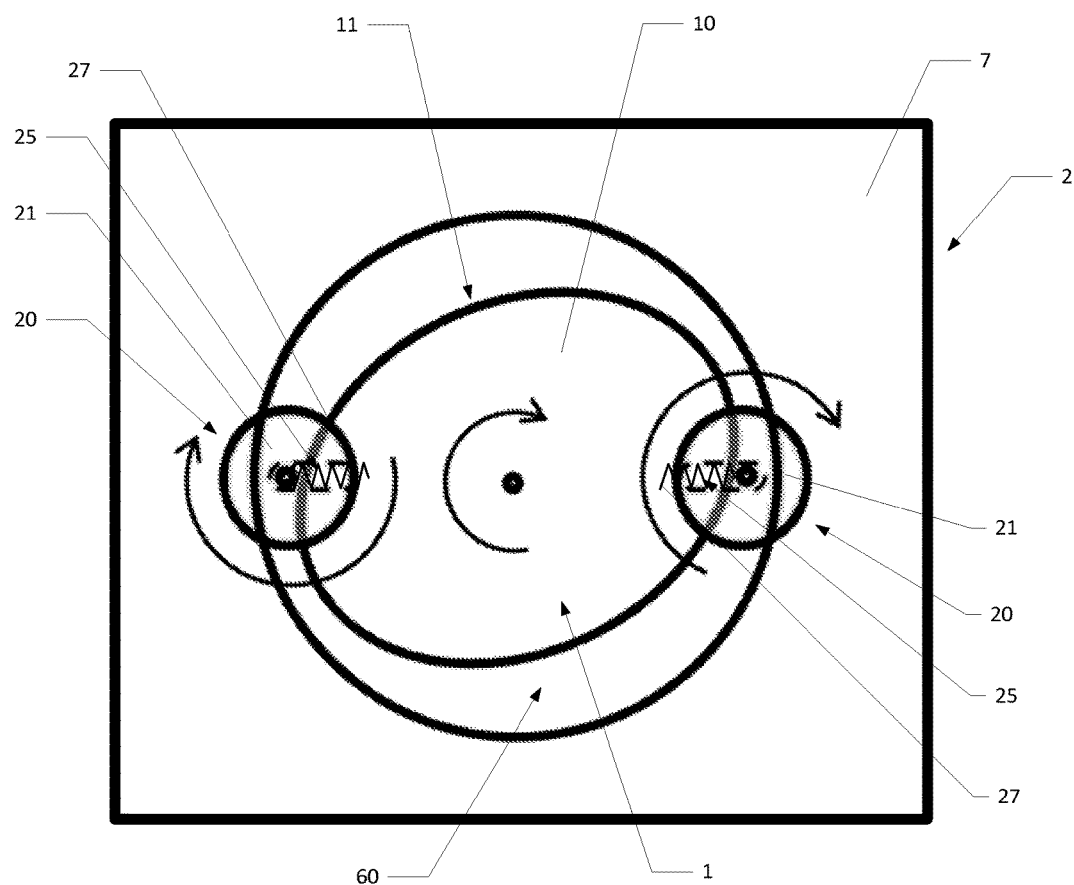
FIG. 3C is a cross-sectional view of a workpiece and contacting elements of a tool according to example implementations of the present disclosure disposed in an operating position.
Figure 3D:
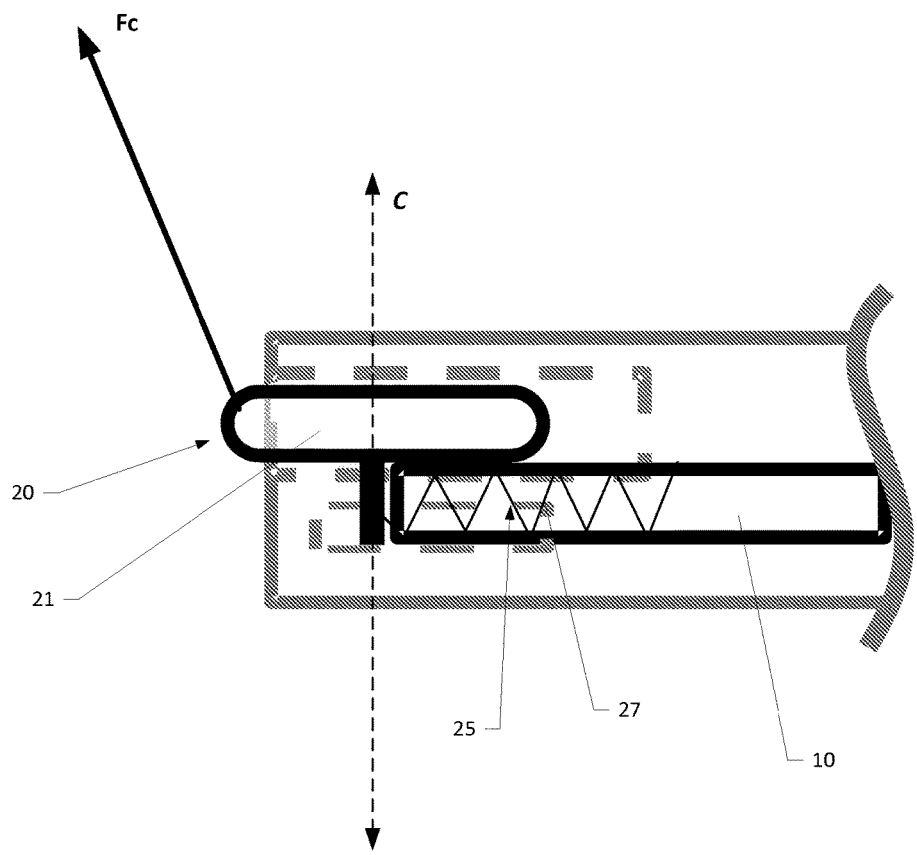
FIG. 3D is a partial, cross-sectional view of a housing portion and a contacting element of a tool according to example implementations of the present disclosure.
Figure 4A:
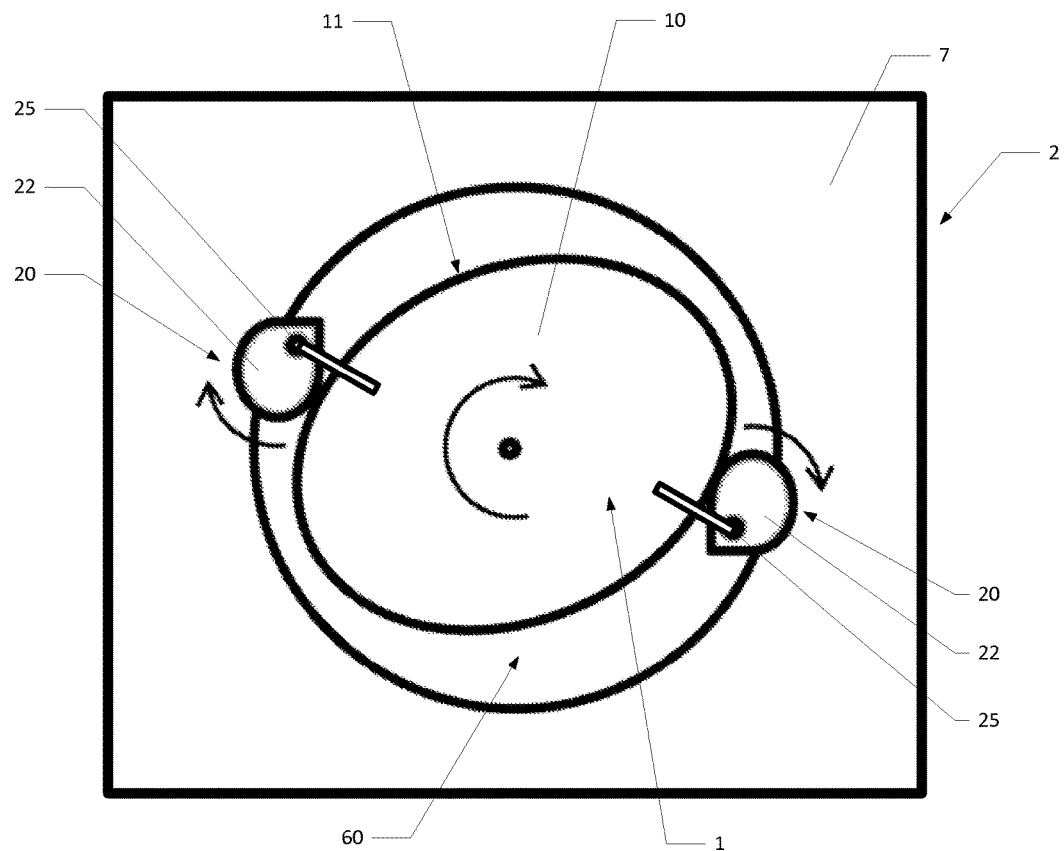
FIG. 4A is a cross-sectional view of a workpiece and contacting elements of a tool according to example implementations of the present disclosure disposed in an operating position.
Figure 4B:
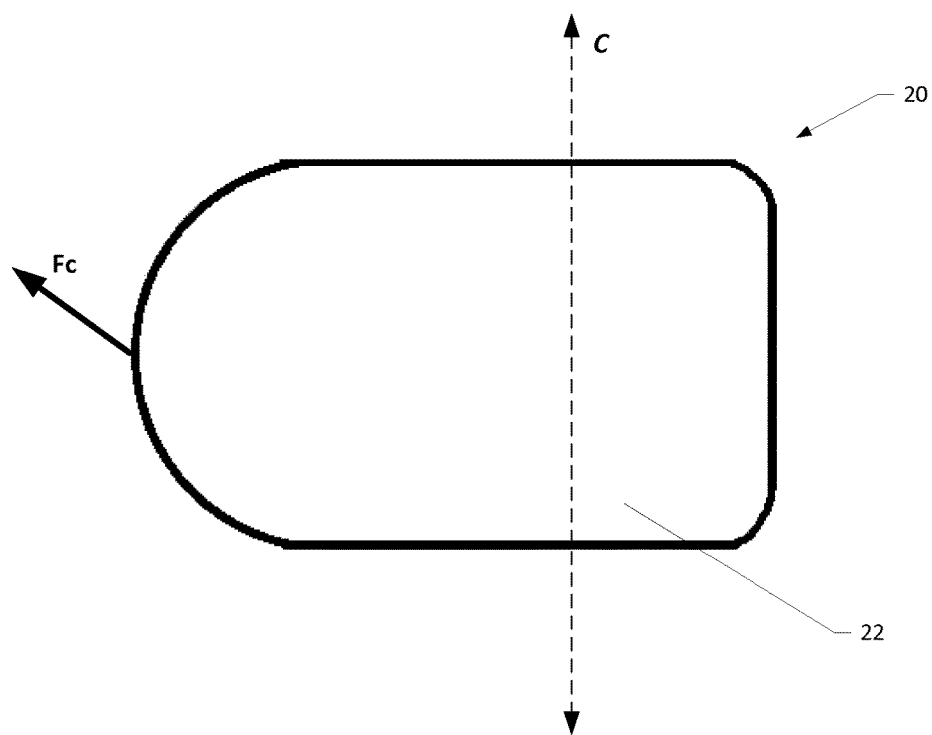
FIG. 4B is a partial, cross-sectional view of a contacting element of a tool according to example implementations of the present disclosure.
Figure 5A:
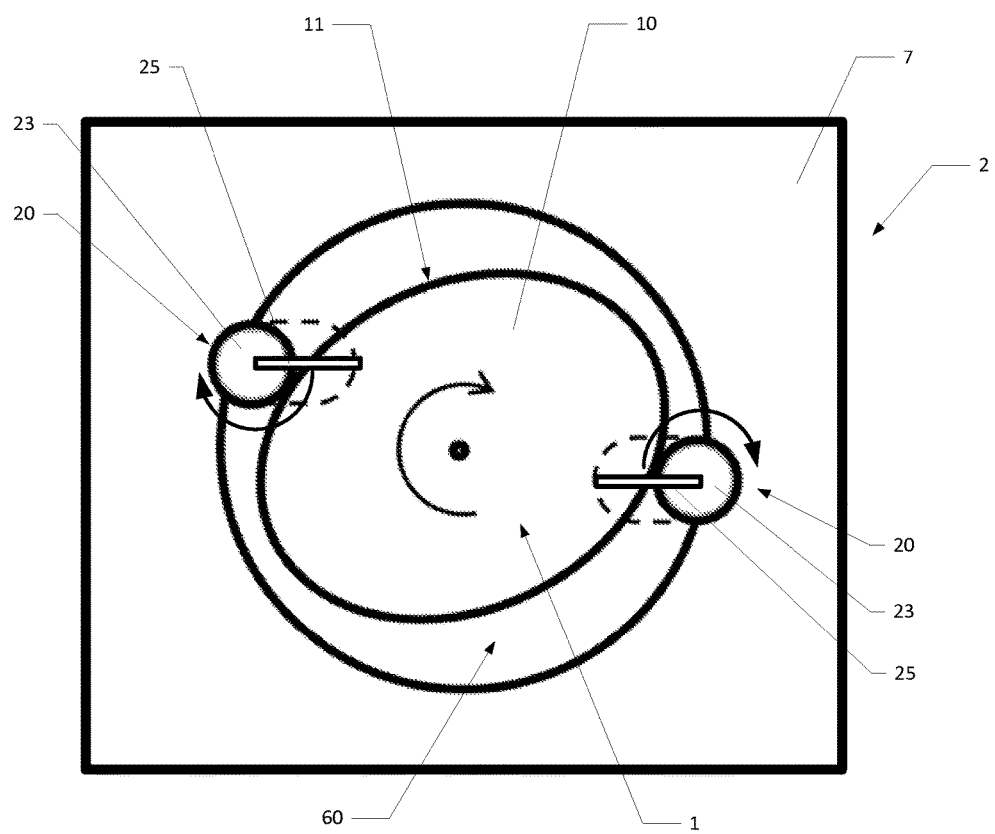
FIG. 5A is a cross-sectional view of a workpiece and contacting elements of a tool according to example implementations of the present disclosure disposed in an operating position.
Figure 5B:
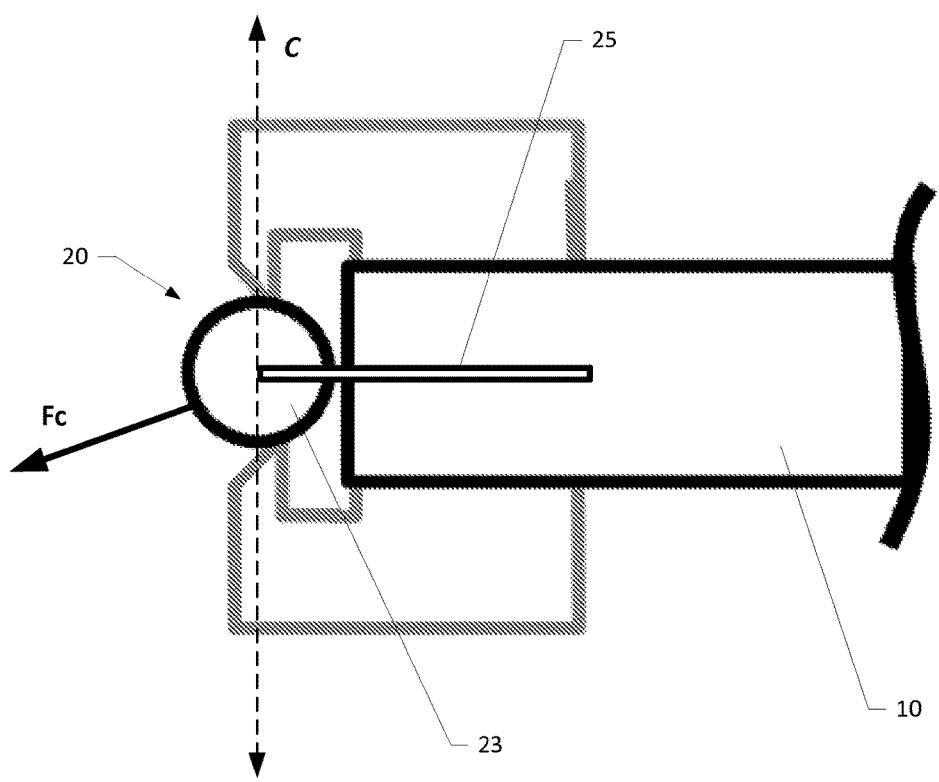
FIG. 5B is a partial, cross-sectional view of a housing portion and a contacting element of a tool according to example implementations of the present disclosure.

As shown in FIGS. 3A, 3C, 4A and 5A, the plurality of contacting elements 20 may differ in shape from one exemplary implementation to another implementation. Additionally, the contacting elements 20 within a single implementation may differ in shape from one another (i.e., a first contacting element of a tool may be shaped differently from a second contacting element of the tool). FIGS. 3A, 3B, 3C and 3D illustrate contacting elements 20 shaped and configured as rolling wheel-type contacting elements 21. FIGS. 4A and 4B illustrate contacting elements 20 shaped and configured as knuckle-type contacting elements 22, and FIGS. 5A and 5B illustrate contacting elements 20 shaped and configured as ball bearing-type contacting elements 23. Further, the contacting elements 20 may be configured to rotate about their longitudinal axis C when the contacting elements 20 operably engage and interact with the sidewall 61 of the orifice 60 at the interface 5 when positioned in the operating position.

Additionally, the various shapes of the contacting elements 20 may further provide for differing interactions between the contacting elements 20 and the workpiece 2 proximate the interface 5. For example, the rolling wheel-type contacting elements 21 illustrated in FIGS. 3A and 3B and the ball bearing-type contacting elements 23 illustrated in FIGS. 5A and 5B may be configured to plastically deform a portion of the workpiece 2 proximate the interface 5 within the orifice 60. More specifically, the contacting elements 21, 23 can plastically deform the portion of the workpiece 2 by imparting a coining force Fc to the sidewall 61 of the orifice 60 as the contacting elements 21, 23 roll along the sidewall 61 at or near the interface 5 when the housing portion 10 rotates. In another implementation, the knuckle-type contacting elements 22 illustrated in FIGS. 4A and 4B may be configured to plastically deform a portion of the workpiece 2 proximate the interface 5 by imparting a coining force Fc as the contacting elements 22 gall and/or burnish the sidewall 61 at the interface 5 when the housing portion 10 rotates.

In some example implementations, physical characteristics of the contacting elements 20 may differ from one another to obtain a desired result from the operable engagement of the contacting elements 20 with the sidewall 61 of the orifice 60 at the interface 5. For example, the contacting elements 20 may have any suitable surface finish, texture, and/or materials that enable the tool 1 to function as described herein. In one implementation, the contacting elements 20 may include a substantially smooth finish and/or texture to minimize shearing of the workpiece material when the contacting elements 20 operably engage the interface 5. In another implementation, the contacting elements 20 may include a material that has a hardness greater than or equal to a hardness of the material of the first layer 6 and/or a hardness of the material of the second layer 7 before the contacting elements 20 operably engage the interface 5. For example, in one implementation where the material of the first layer 6 differs from the material of the second layer 7, and the material of the first layer 6 has a hardness that is less than the hardness of the material of the second layer 7, contacting elements 20 that have a hardness greater than the material of the second layer 7 may plastically deform the first layer 6 and the second layer 7 in differing magnitudes. In another example implementation, the contacting elements 20 may have an initial hardness that is greater than the hardness of the material of the first layer 6 and/or the second layer 7. As the contacting element(s) 20 operably engage and plastically deform the interface 5 between the first and second layers 6, 7, the coining force imparted by the contacting element(s) 20 may strain harden the materials of the first and second layers 6, 7 such that the hardness of the materials of the first and second layers 6, 7 increases to a level greater than the hardness of the contacting element(s) 20. In other implementations, the material of the contacting elements 20 may be selected to balance, control, and/or optimize the durability, wear, and/or replacement intervals of the contacting elements 20, the tool 1, and/or any associated components of the tool 1. For example, the material of the contacting elements 20 may be selected with consideration of the hardness of the materials of both the first layer 6 and the second layer 7.

Additionally or alternatively, the configuration of the contacting elements 20, and more particularly, the positions of the contacting elements 20 with respect to each other and/or the housing portion 10 may be different in different implementations. For example, FIGS. 3A, 4A and 5A illustrate first and second contacting elements 20 being diametrically opposed about the housing portion 10. Alternative implementations may include two or more contacting elements positioned about the peripheral surface 11 at equal or different circumferential intervals from each other. For example, a tool 1 may include three contacting elements 20 disposed at approximately 120 degree intervals about the longitudinal axis Z of the housing portion 10 proximate the peripheral surface 11. In some implementations, the positions of the contacting elements 20 with respect to each other and/or the housing portion 10 may be selected to produce a desired result when the contacting elements 20 operably engage the sidewall 61 of the orifice 60. In this regard, the contacting elements 20 may be configured and/or positioned about the peripheral surface 11 of the housing portion 10 to obtain a desired deformation geometry, surface finish, and/or other physical property of the sidewall 61 proximate the interface 5.

Figure 6:
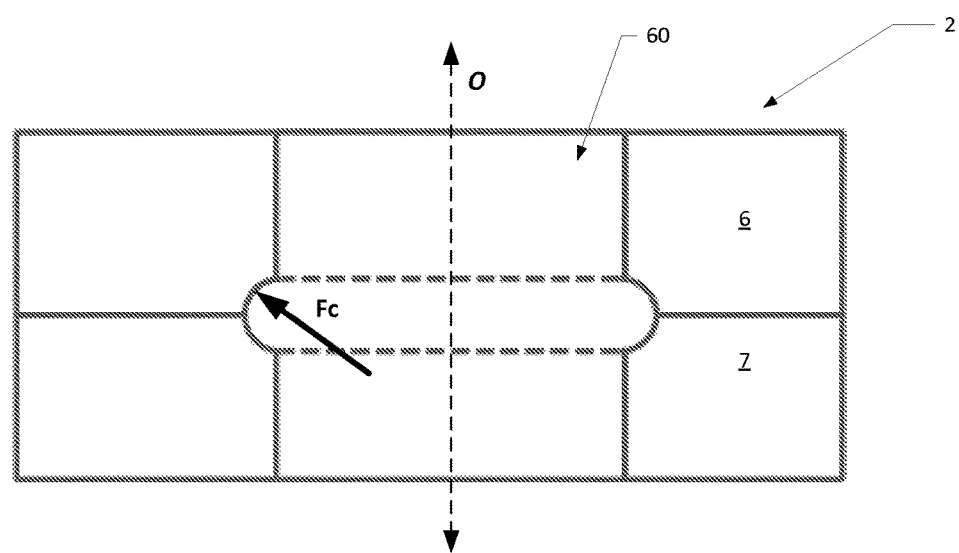
FIG. 6 is a cross-sectional view of a workpiece after a tool according to example implementations of the present disclosure has operably engaged the workpiece.

FIGS. 3B, 4B and 5B are partial cross-sectional views of contacting elements 20 according to various implementations of the present disclosure. In particular, FIGS. 3B, 4B and 5B illustrate that the respective contacting elements 20 may impart a coining force $F_c$ to the sidewall 61 of the orifice 60 proximate the interface 5 when the contacting elements 20 are operably engaged with the workpiece 2 and/or in the operating position. Additionally, FIGS. 3B, 4B and 5B illustrate that a coining force $F_c$ may differ in direction and magnitude from one implementation of the contacting elements to another implementation of the contacting elements. In particular, as shown in FIG. 6, a coining force $F_c$ may have an angle and a magnitude based at least in part on the composition of the materials of the first layer 6 and the second layer 7 of the workpiece 2 and/or the shape, configuration, and/or material of the contacting elements 20. For example, when the first layer 6 is a metallic material having a hardness greater than the hardness of the material of the second layer 7 (e.g., a carbon-fiber reinforced polymer), a contacting element 20 may be configured to impart a coining force $F_c$ having a first force magnitude directed towards the first layer 6 and a second force magnitude directed towards the second layer 7, where the first force magnitude is greater than the second force magnitude. By imparting different force components to each layer 6, 7, a desired plastic deformation of the sidewall 61 proximate the interface 5 is obtained. Accordingly, the resultant coining force $F_c$ applied to the sidewall 61 proximate the interface 5 may account for differences in hardness between the materials of the first layer 6 and the second layer 7.

Additionally, as shown in FIGS. 3A, 3B, 3C, 3D, 4A, 5A, and 5B, some example implementations provide a tool 1 that includes at least one positioning element 25 operably engaged with the at least one contacting element 20. According to one exemplary implementation, the at least one positioning element 25 is configured to provide a biasing force that biases the at least one contacting element 20 toward the stored position. For example, as shown in FIGS. 3C and 3D, one example implementation of a tool 1 includes two roller wheel contacting elements 21 that move from a stored position to an operating position upon rotation of the housing portion 10. Additionally, the tool 1 may include at least one positioning element 25 operably engaged with each of the contacting elements 20. In particular, the positioning element 25 may be configured to provide a biasing force to the contacting element 20. For example, the tool 1 may include a positioning element 25 that includes a biasing element 27 configured to provide a biasing force to the contacting element 20. In this regard, at least one the positioning element 25 may be operably engaged with the at least one contacting element 20 to provide a biasing force that biases the at least one contacting element 20 toward the stored position.

In some implementations, the biasing element 27 may comprise a spring; however, the biasing element 25 can be any suitable component that enables the contacting elements 20 to function as described herein. In some implementations, rotation of the housing portion 10 may be sufficient to at least negate the biasing force provided by the biasing element 27 and thereby cause the contacting element(s) 20 to move from the stored position to the operating position. That is, the rotation of the housing portion 10 may provide a force on the contacting element 20 that opposes the biasing force provided by the biasing element 27. In particular, rotation of the housing portion 10 may provide an opposing force on the contacting element 20 that at least negates or overcomes the biasing force imparted by the biasing element 27, thereby causing the at least one contacting element 20 to move from the stored position to the operating position.

In another exemplary implementation, the positioning element 25 may be configured to operably engage the at least one contacting element 20 to move the at least one contacting element 20 between the stored position and the operating position. For example, as shown in FIGS. 3A and 3B, the positioning element 25 may be configured to operably engage the at least one contacting element 20 to move the at least one contacting element 20 from the stored position to the operating position. In particular, the positioning element 25 include an actuating element 26 that may be any suitable actuator configured to move the at least one contacting element 20 between the stored position and the operating position. For example, the actuating element 26 may include a hydraulic piston, a pneumatic piston, and/or the like that is configured to move the at least one contacting element 20 between the stored position and the operating position. In some implementations, once the actuating element 26 has moved the at least one contacting element 20 from the stored position to the operating position, a controller operably engaged with the motor of the power unit 50 may cause the housing portion 10 to rotate about the longitudinal axis of the housing portion 10.

Figure 7:
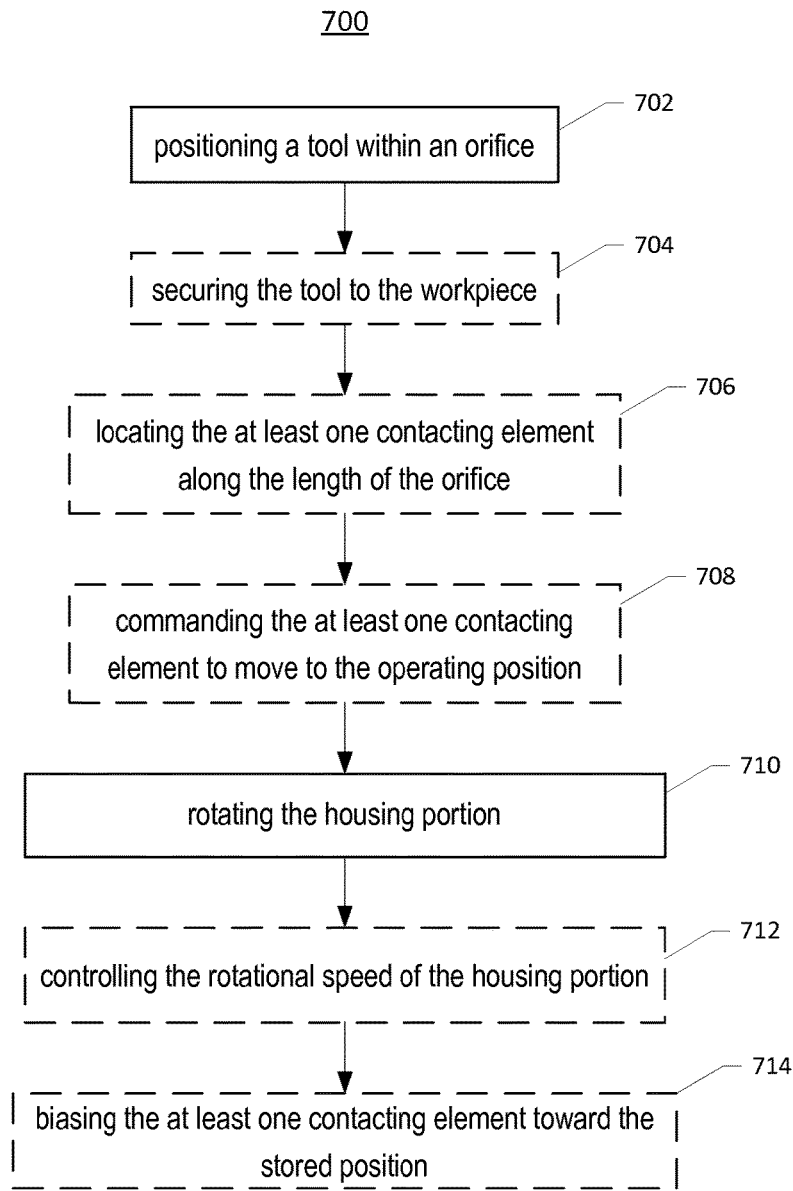
FIG. 7 is a schematic block diagram for a method of machining an interface between coplanar first and second materials of a workpiece according to example implementations of the present disclosure.

A method of machining the interface 5 using the tool 1 is also provided. For example, FIG. 7 illustrates such a method 700 for machining the interface 5 within the orifice 60. The method 700 can be used with the tool 1 (shown in FIGS. 1A-6) and, accordingly, the description of the tool 1 described above applies to the following description of the method 700. In one implementation, the method 700 includes positioning a tool 1 within the orifice 60 (Block 702).

The method 700 may optionally include securing the tool 1 to the workpiece 2 with a clamping mechanism 40 when the tool is positioned at least partially within the orifice (Block 704). In this regard, to clamp the tool 1, the first clamp 41 is positioned proximate the first end 13 of the housing portion 10 and the second clamp 42 is positioned proximate the second end 14 of the housing portion 10. Additionally, the method 700 may optionally include locating the position of the at least one contacting element 20 along the longitudinal axis O of the orifice 60 (Block 706). In particular, the first and second clamps 41, 42 position the housing portion 10 such that the at least one contacting element 20 is disposed proximate to and coplanar with the interface 5 when the at least one contacting element 20 is disposed in the operating position. According to some implementations, the first and second clamps 41, 42 may be configured to position the housing portion 10 within the orifice 60 such that the location of the at least one contacting element 20 may be determined with respect to the length of the orifice 60. For example, the longitudinal position of the at least one contacting element 20 with respect to the housing portion 10 may be known. Additionally, the longitudinal position of the first and second clamps 41, 42 with respect to the housing portion 10 may also be known. As such, the first and second clamps 41, 42 may determine the position of the at least one contacting element along the length of the orifice 60 when the tool 1 is positioned within the orifice. Additionally, the first and second clamp 41, 42 may be configured to secure the housing portion 10 with respect to the workpiece 2 to limit movement of the tool 1 along the longitudinal axis Z.

The method 700 may further optionally include commanding the at least one contacting element 20 to move from the stored position to the operating position (Block 706). For example, a controller in the power unit 50 may be configured to actuate a positioning element 25 to move the contacting element 20 from the stored position to the operating position. In another implementation, the controller may be configured to operably engage a motor of the power unit 50 to rotate the housing portion 10 such that the at least one contacting element 20 moves from the stored position to the operating position.

The method 700 further includes rotating the housing portion 10 with respect to its longitudinal axis Z (Block 710). For example, the method 700 may include rotating the housing portion 10 using the power unit 50. In one exemplary implementation, the housing portion 10 is rotated about the longitudinal axis Z of the housing portion 10 to extend the at least one contacting element 20 into the operating position. As mentioned previously, rotation of the housing portion 10 about the longitudinal axis Z thereof may provide an opposing force on the contacting elements 20 that overcomes or at least negates a biasing force on the contact elements 20. Accordingly, the rotation moves the contacting element(s) 20 from the stored position to the operating position. According to another exemplary implementation, the housing portion 10 may be rotated about the longitudinal axis Z of the housing portion 10 after the at least one contacting element 20 has been positioned in the operating position. Accordingly, the rotation of the housing portion 10 provides for the contacting element 20 to engage and compress the sidewall 61 at the interface 5.

Additionally, some example implementations of the method 700 optionally include controlling and/or varying the rotational speed of the housing portion 10 (Block 712). For example, the rotational speed of the housing portion 10 may vary depending on the configuration of the contacting element(s) 20 and/or the configuration of the biasing element(s) 25 with respect to the housing portion 10. In some implementations, the housing portion 10 may be rotated about the longitudinal axis Z at a low speed when the tool 1 includes a single contacting element 20. In another implementation, the housing portion 10 may be rotated about the longitudinal axis Z at a higher speed when the tool 1 includes a plurality of contacting elements 20.

According to the exemplary implementation, the method 700 may include rotating the housing portion 10 (Block 710) such that the at least one contacting element 20 operably engages and plastically deforms the interface 5 between the first layer 6 and the second layer 7. More particularly, the method 700 may include rotating the housing portion 10 (Block 710) to remove any burrs 8 about the interface 5 while plastically deforming the sidewall 61 at interface 5 when the at least one contacting element 20 is in the operating position.

In one implementation, the method 700 may optionally include biasing the at least one contacting element 20 toward the stored position using the at least one positioning element 25 (Block 714). Additionally, rotating the housing portion 10, as shown in Block 710, may at least negate the biasing force provided by the at least one positioning element 25 to move the at least one contacting element 20 from the stored position to the operating position.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A tool configured to machine an interface between coplanar first and second layers of a workpiece that defines an orifice extending at least partially through the first and second layers and intersecting the interface, the tool comprising:
   a housing portion having a first end, a longitudinally-opposed second end, and a peripheral surface extending between the first end and the second end, the housing portion configured to rotate about a longitudinal axis of the housing portion and extend at least partially through the orifice;
   at least one contacting element operably engaged with the housing portion between the first and second ends and proximate the peripheral surface, the at least one contacting element movable between a stored position at or under the peripheral surface and an operating position outwardly of the peripheral surface, and the at least one contacting element being configured to extend outwardly from the peripheral surface of the housing portion to operably engage the interface between the first layer and the second layer within the orifice when the at least one contacting element is in the operating position; and
   a power unit operably engaged with the housing portion, the power unit being configured to rotate the housing portion.

2. The tool of claim 1 further comprising a clamping mechanism including:
   a first clamp configured to couple to the first end of the housing portion; and
   a second clamp configured to couple to the second end of the housing portion,
   wherein the clamping mechanism is configured to position the housing portion at least partially through the orifice when the clamping mechanism is coupled to the housing portion and the workpiece such that the at least one contacting element operably engages the interface between the first layer and the second layer within the orifice when the contacting element is in the operating position.

3. The tool of claim 1, wherein the at least one contacting element is configured to plastically deform the interface between the first layer and the second layer when the at least one contacting element is in the operating position.

4. The tool of claim 3, wherein the at least one contacting element is configured to manipulate any burrs about the interface while plastically deforming the interface when the at least one contacting element is in the operating position.

5. The tool of claim 1 further comprising at least one positioning element operably engaged with the at least one contacting element, the at least one positioning element being configured to move the at least one contacting element between the stored position and the operating position.

6. The tool of claim 5, wherein the at least one positioning element operably engaged with the at least one contacting element is configured to move the at least one contacting element from the stored position to the operating position.

7. The tool of claim 1, wherein the at least one contacting element comprises a material having a hardness equal to or greater than a hardness of at least one of a material of the first layer and a material of the second layer before the at least one contacting element operably engages the interface.

8. The tool of claim 1, wherein a cross-sectional area of the housing portion is shaped as a cam.

9. The tool of claim 1, wherein the at least one contacting element is one of a rolling wheel contacting element, a knuckle contacting element, and a ball bearing contacting element.

10. The tool of claim 1, wherein the at least one contacting element is configured to rotate about a longitudinal axis of the at least one contacting element when the at least one contacting element is in the operating position.

11. The tool of claim 1, wherein the orifice extending at least partially through the first and second layers has an axis that is substantially perpendicular to the interface between coplanar first and second layers of the workpiece.

12. A method of machining an interface between coplanar first and second layers of a workpiece using a tool including a housing and at least one contacting element, the housing portion having a first end, a longitudinally-opposed second end, and a peripheral surface extending between the first end and the second end, the at least one contacting element operably engaged with the housing portion between the first and second ends and proximate the peripheral surface and configured to move between a stored position and an operating position, the method comprising:
   positioning a tool within an orifice extending at least partially through the first and the second layers of the workpiece, a sidewall of the orifice intersecting the interface;
   engaging and compressing the sidewall at the interface using the at least one contacting element in the operating position;
   rotating the housing portion about a longitudinal axis of the housing portion using a power unit.

13. The tool of claim 2, wherein the first clamp and the second clamp extend beyond the housing portion.

14. A tool configured to machine an interface between coplanar first and second layers of a workpiece that defines an orifice extending at least partially through the first and second layers and intersecting the interface, the tool comprising:
- a housing portion having a first end, a longitudinally-opposed second end, and a peripheral surface extending between the first end and the second end, the housing portion configured to rotate about a longitudinal axis of the housing portion and extend at least partially through the orifice;
- at least one contacting element operably engaged with the housing portion between the first and second ends and proximate the peripheral surface, the at least one contacting element movable between a stored position at or under the peripheral surface and an operating position outwardly of the peripheral surface, and the at least one contacting element being configured to extend outwardly from the peripheral surface of the housing portion to operably engage the interface between the first layer and the second layer within the orifice when the at least one contacting element is in the operating position; and
- a clamping mechanism including:
  - a first clamp configured to couple to the first end of the housing portion; and
  - a second clamp configured to couple to the second end of the housing portion,
  - wherein the clamping mechanism is configured to position the housing portion at least partially through the orifice when the clamping mechanism is coupled to the housing portion and the workpiece such that the at least one contacting element operably engages the interface between the first layer and the second layer within the orifice when the contacting element is in the operating position.

15. The tool of claim 14, further comprising a power unit operably engaged with the housing portion, the power unit being configured to rotate the housing portion.

16. The tool of claim 14, wherein the at least one contacting element is configured to plastically deform the interface between the first layer and the second layer when the at least one contacting element is in the operating position.

17. The tool of claim 16, wherein the at least one contacting element is configured to manipulate any burrs about the interface while plastically deforming the interface when the at least one contacting element is in the operating position.

18. The tool of claim 14, further comprising at least one positioning element operably engaged with the at least one contacting element, the at least one positioning element being configured to move the at least one contacting element between the stored position and the operating position.

19. The tool of claim 18, wherein the at least one positioning element operably engaged with the at least one contacting element is configured to move the at least one contacting element from the stored position to the operating position.

20. The tool of claim 14, wherein the at least one contacting element comprises a material having a hardness equal to or greater than a hardness of at least one of a material of the first layer and a material of the second layer before the at least one contacting element operably engages the interface.

21. The tool of claim 14, wherein a cross-sectional area of the housing portion is shaped as a cam.

22. The tool of claim 14, wherein the at least one contacting element is one of a rolling wheel contacting element, a knuckle contacting element, and a ball bearing contacting element.

23. The tool of claim 14, wherein the at least one contacting element is configured to rotate about a longitudinal axis of the at least one contacting element when the at least one contacting element is in the operating position.

24. The tool of claim 14, wherein the orifice extending at least partially through the first and second layers has an axis that is substantially perpendicular to the interface between coplanar first and second layers of the workpiece.

* * * * *